United States Patent [19]

Lyman

[11] Patent Number: 4,674,928

[45] Date of Patent: Jun. 23, 1987

[54] MILLING MACHINE CONTROLLER

[76] Inventor: George Lyman, P.O. Box, Kennebunkport, Me. 04046

[21] Appl. No.: 793,655

[22] Filed: Oct. 31, 1985

Related U.S. Application Data

[63] Continuation of Ser. No. 624,273, Jun. 25, 1984, abandoned, which is a continuation of Ser. No. 299,316, Sep. 4, 1981, abandoned.

[51] Int. Cl.⁴ .................................................. B23C 1/16
[52] U.S. Cl. ......................................... 409/80; 318/568
[58] Field of Search .................... 409/79, 80, 147, 148, 409/179, 220; 318/568; 408/3, 11

[56] References Cited

U.S. PATENT DOCUMENTS

| | | | |
|---|---|---|---|
| 2,537,770 | 1/1951 | Livingston et al. | 318/568 |
| 2,698,410 | 12/1951 | Madsen et al. | 318/568 |
| 2,882,476 | 4/1959 | Wezel | 409/80 X |
| 3,238,430 | 3/1966 | Schumann | 318/568 |

Primary Examiner—William R. Briggs
Attorney, Agent, or Firm—Wolf, Greenfield & Sacks

[57] ABSTRACT

The controller attaches to a milling machine such as the well-known Bridgeport miller so as to adapt the machine to programmed automatic operation. Controls are associated with all axes of operation, however, the control is described herein with regard to X and Y axis control. A control panel for all operations is physically mounted in association with the X axis table. The basic components of the system include power motors for respectively controlling lead screws associated with X and Y axis control, electrical relays which in turn control the power motors, optical encoders which essentially read lead screw rotation, and a microprocessor. The electrical relays are used to start, stop, and set the directional rotation of the power motors upon commands from the microprocessor. The microprocessor has two basic modes of operation including a program mode in which the steps performed by the machinist are recorded for subsequent repeatability. The other mode is a run mode during which the microprocessor progresses through the previously established program from start to finish to thus reproduce a part.

8 Claims, 7 Drawing Figures

MILLING MACHINE CONTROLLER

This application is a continuation of application Ser. No. 624,273 filed 6-25-84, abandoned which in turn is continuation of Ser. No. 299,316 filed 9-4-81 abandoned.

BACKGROUND OF THE INVENTION

The present invention relates in general to a controller for a milling machine and pertains, more particularly, to a controller for automating a milling machine so as to provide accurate reproducability of parts. The controller enables operation in basically two modes including a program mode in which the machinist by going through a series of machining steps essentially records a program, and a run mode in which the previously recorded program is used for automatic control of the machine. The controller of this invention is adapted to provide operation substantially identically on part after part with a repeatability accuracy of on the order of + or −0.001 inch. Furthermore, although the system incorporates a microprocessor, it can be operated by an ordinary machinist without requiring any knowledge of digital information processing.

Programmable milling machines presently available are quite costly, whereas the device of the present invention can be constructed for only a fraction of the cost of existing machines and can be used to convert a milling machine such as a Bridgeport miller into an automated machine. Furthermore, with the present invention, the operation is much easier without requiring a skilled programmer.

One of the main reasons as to why existing machines are relatively expensive is because they operate on the premise of completely eliminating backlash between the lead screw that drives the table and the nut or similar device fixed to the milling machine. A normal milling machine, even when new has some looseness or play which makes programming very difficult by means of a normal digital keyboard input. Assuming that one turns the handcrank attached to the lead screw on the moveable table in one direction, for each rotation of the crank the table moves approximately 0.200 inches. In reversing the direction of rotation, because of necessary tolerances and because of wear, the table generally will not move for from ⅛ to ¼ of a turn. Since most of the work is accomplished with the work near the center of the table, the wear is greater near the center of the lead screw than at the ends. Therefore, there might be a backlash of say 0.048 inch at one point and perhaps 0.019 inch near the ends of the screw. Because existing numerical control machines operate on the premise of feeding digital information to the milling machine from a program, there is no practical way to take this variation into account, particularly since one usually desires an accuracy on the order of + or −0.001 inch. For this reason, programmable milling machines try to completely eliminate backlash through extremely expensive techniques such as the use of pre-loaded ball screws. Furthermore, machines of this sort must be programmed by a skilled programmer who must interpret a drawing into numerical language usually using a device similar to a typewriter in constructing a program paper tape to input to the microprocessor. Punched paper tape is most commonly used but magnetic computer tape may also be used. Normally, the average machinist is not capable of operating such a highly sophisticated programmable machine.

Moreover, the completed program with such existing machines is entered into a reader on the milling machine and this requires a skilled set-up man. This means that man and machine time and possibly some parts are sacrificed while setting up the machine.

Accordingly, it is an object of the present invention to provide an improved controller for a milling machine or the like that is of much simpler construction and which eliminates the need for taking into account backlash and similar tolerance problems inherent in a milling machine.

Another object of the present invention is to provide an improved controller for a milling machine which provides for the accurate reproducability of parts.

Still another object of the present invention is to provide an improved controller for a milling machine or the like which in particular can be operated by the normal machinist without requiring the use of a skilled programmer or skilled set-up man.

Still a further object of the present invention is to provide an improved controller for a milling machine that has an easily useable control panel and which is adapted to provide for control for all axes of operation, particularly X and Y operation.

Still another object of the present invention is to provide an improved controller for a milling machine including improved mechanical coupling to the lead screw which controls the machine table.

SUMMARY OF THE INVENTION

To accomplish the foregoing and other objects of this invention there is provided a controller for a milling machine adapted in the disclosed embodiment for controlling both the X axis table and the Y axis table of the machine. It is understood that the principles of the invention may also be applied for Z axis control, however, for simplicity, only the X and Y axis control is described herein. The basic operator controls occur by way of a control panel which is preferably secured to the X axis table. This control panel controls, of course, both X and Y axis operation. The machinist himself essentially "writes the program" by simply going through in sequence all of the necessary steps in machining a particular part. This is done in the program mode of operation. All of these steps as to directional and rotational parameters are recorded in a microprocessor, preferably by way of an optical encoder associated with the lead screw and stored as a main program for the particular part to be reproduced. In addition to the program mode, there may also be selected, the run mode. During the run mode the microprocessor progresses through the previously recorded programmed steps from start to finish to reproduce the same part which was first constructed manually by the machinist.

In addition to the optical sensors associated with the lead screw and the microprocessor, the controller also includes certain control electronics, power motors and associated electrical relays. The power motors provide the power to turn the lead screw which in turn drives the machine table. The electrical relays are used to start, stop, and select the directional rotation of the power motors upon commands from the microprocessor. The optical encoders as mentioned previously measure the distance the table moves during a machining step.

More particularly, in the program mode, the optical encoder associated with a lead screw outputs a certain number of pulses per revolution of the lead screw corresponding to a predetermined distance of travel of the machine table. As the machinist is performing a machining step, the encoder is outputting electrical pulses to the microprocessor. At the end of one particular step the machinist signals the microprocessor that the step is complete by waiting for a predetermined period of time before performing the next step. The microprocessor then stores the total number of pulses, the direction of rotation and which axis of the table was moved (X or Y). The information concerning rotational direction is provided by the encoder. This storage process is repeated until all X, Y machining steps have been completed. The control panel also permits the machinist to program in a "pause" after any machining step. The purpose of the "pause" is to, for example, allow for the change of cutting tools or to manually change the position of the Z axis. In completing the program step, the operator or machinist positions the table in the same place as it was at the start of the program.

To iritiate the run mode, the run button on the control panel is activated. Information previously stored for the first machining step is direction identification, direction of rotation, and distance of travel in the form of the total number of pulses. The computer signals the electrical relay corresponding to the direction identification (i.e. X or Y direction). The computer also signals the relay corresponding to the rotational direction. After both relays have closed, the motor associated with the direction identification starts turning in the direction associated with the rotation direction. As the motor and lead screw are turning, pulses are sent to the microprocessor by the encoder. As each pulse is received by the microprocessor, it is subtracted from the total number of pulses for this machining step. When the total is reduced to zero, the machining step is complete. The relays are then open and the next machining step can be performed in like manner.

BRIEF DESCRIPTION OF THE DRAWINGS

Numerous other objects, features and advantages of the invention should now become apparent upon a reading of the following detailed description taken in conjunction with the accompanying drawings, in which.

DETAILED DESCRIPTION

Figure 1:
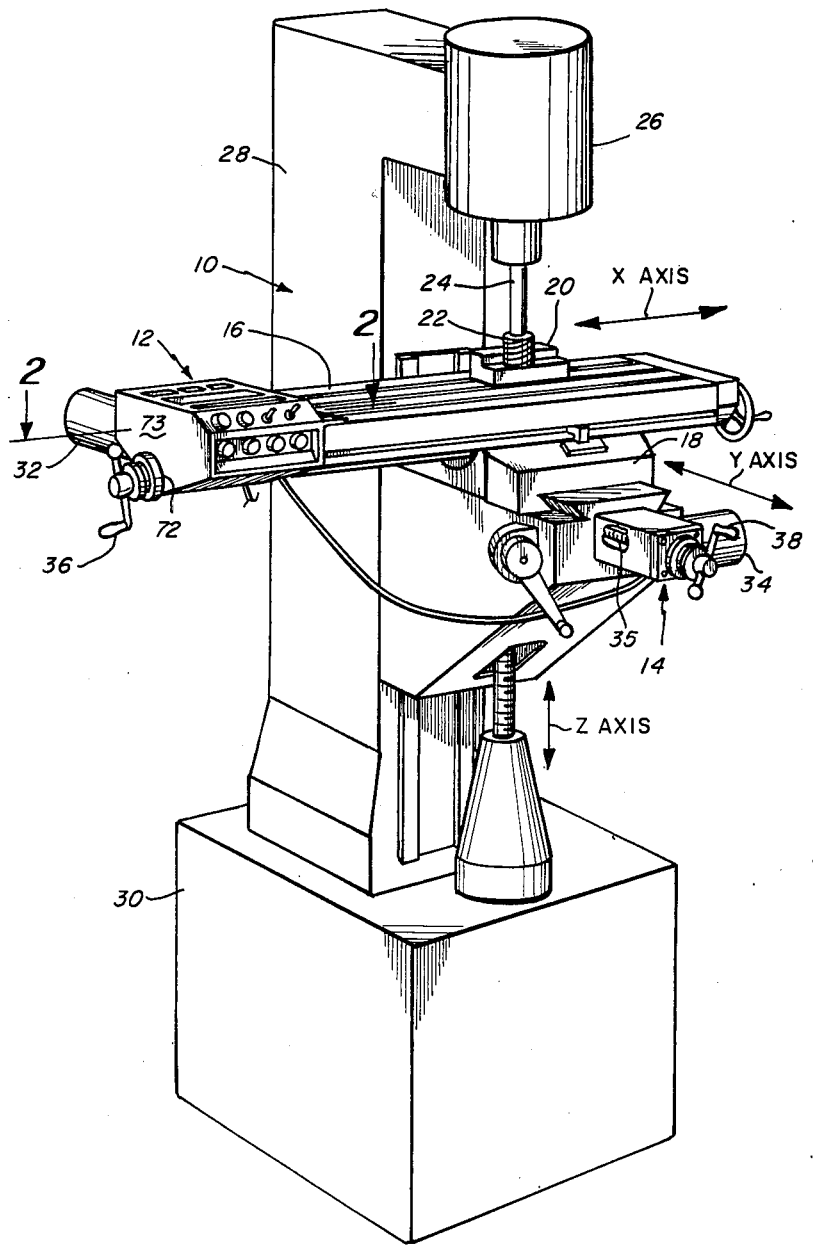
FIG. 1 is a perspective view showing a milling machine incorporating the attachment of the present invention for facilitating automatic operation.

Referring now to the drawings, and in particular to FIGS. 1–4, there is shown a conventional milling machine 10 to which is attached the controller of the present invention including control members 12 and 14. The control member 12 is shown in more detail in FIGS. 2 and 3 and is associated with the X axis table 16. The control member 14 is similarly associated with the Y axis table 18. FIG. 1 also illustrates a piece 20 that is being worked upon showing by way of example a milling cutter 22 supported on shaft 24 from a conventional drive motor 26. The drive motor 26 is supported from the top frame 28 of the milling machine. The milling machine also includes a base 30. For the sake of simplicity and because basic construction of the milling machine is well-known, the construction of the support for the tables is not shown in detail.

As indicated in FIG. 1, there is associated with the control member 12, a gear motor or power motor 32 supported primarily to the rear of the control member 12. Similarly, there is associated with a control member 14, a gear or power motor 34. Both of the control members 12 and 14 are adapted to be secured to the respective tables upon removal of the cranks normally associated with these tables. In FIG. 1 the cranks are shown repositioned on the respective control members. Thus, there is a crank 36 associated with the control member 12 and a crank 38 associated with the control member 14. This arrangement permits control of the milling machine both automatically and by hand at the respective cranks 36 and 38.

As indicated previously, the control members may also be used in association with the Z axis control. However, for the sake of simplicity only X and Y axis control is described herein, it being understood that the invention is intended to cover also Z axis control.

Figure 4:
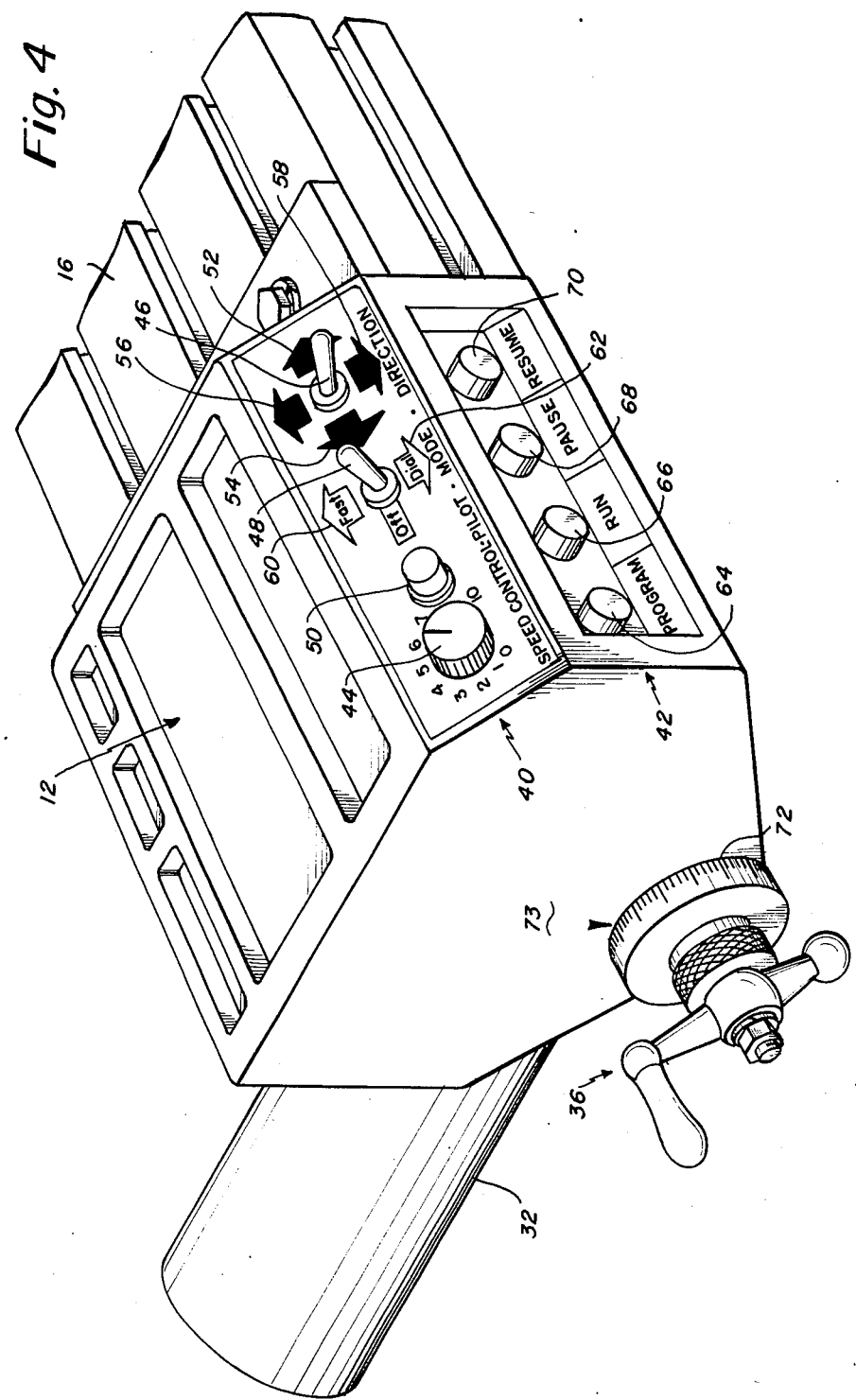
FIG. 4 shows the control panel associated with the machine.

FIGS. 1 and 4 show the control panel. This panel includes a manual section 40 and an automatic section 42. In the manual section there is provided a speed control knob 44 used in association with the direction switch 46 and the mode switch 48. On this section of the panel there is also shown the pilot light 50 which indicates that this section of the control panel is in operation. The switch 46 is a multi-position toggle switch that controls both positive and negative X axis movement of the X axis table 16, along with positive and negative Y axis movement of the Y axis table 18. There are used positive and negative X arrows 52 and 54, respectively and positive and negative Y axis arrows 56 and 58, respectively. The mode switch 48 has a fast position 60 and a dial position 62. In the dial position the machine is controlled in accordance with the setting on the dial 44. In the fast position the machine is controlled at some predetermined maximum rate. The switch 48 also has an off position as indicated in FIG. 4.

The automatic section of the control panel includes four control buttons including a "program" button 64, a "run" button 66, a "pause" button 68, and a "resume" button 70.

Figure 5:
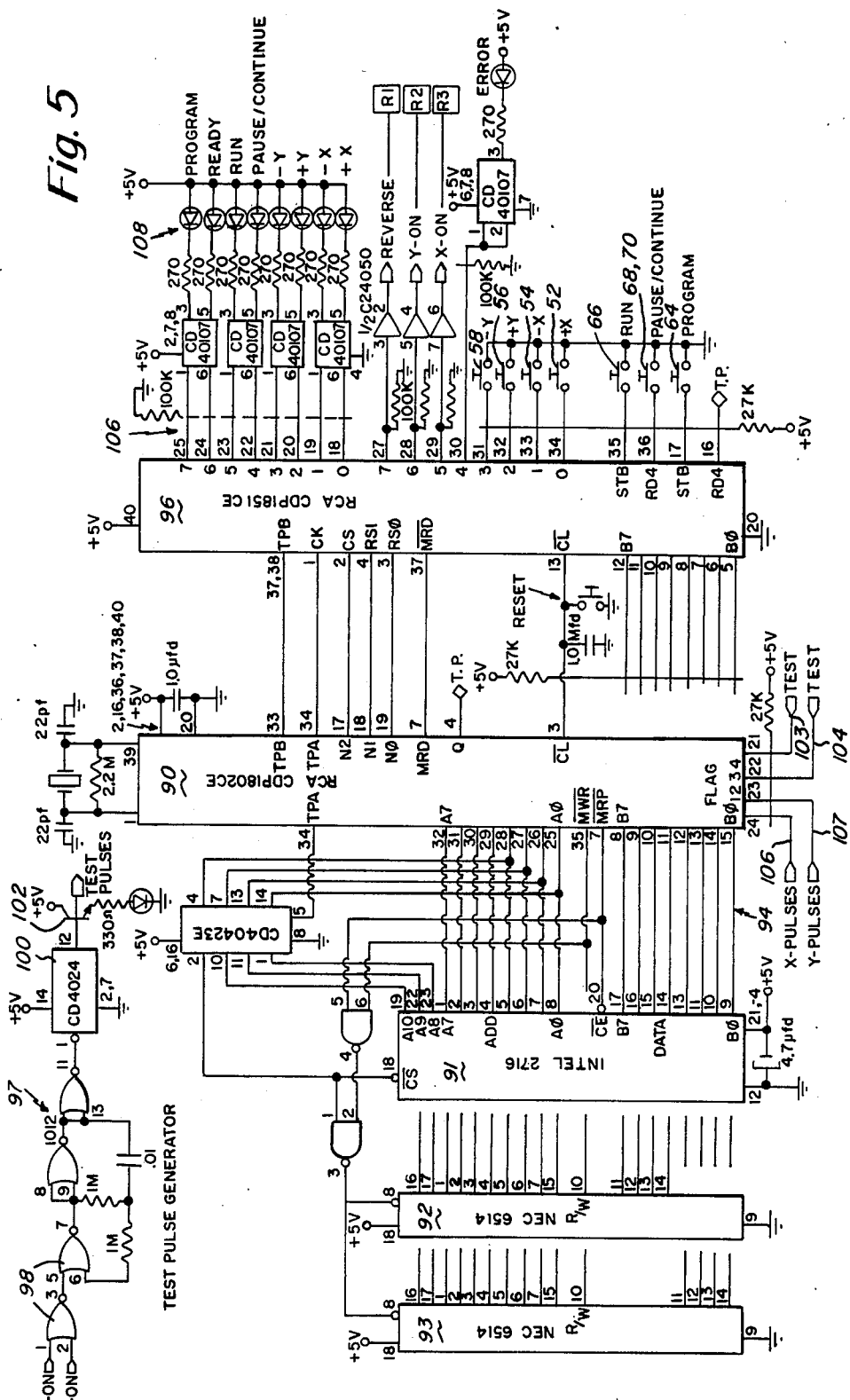
FIG. 5 is an electronic diagram of the electronic control associated with the system.
Figure 6A:
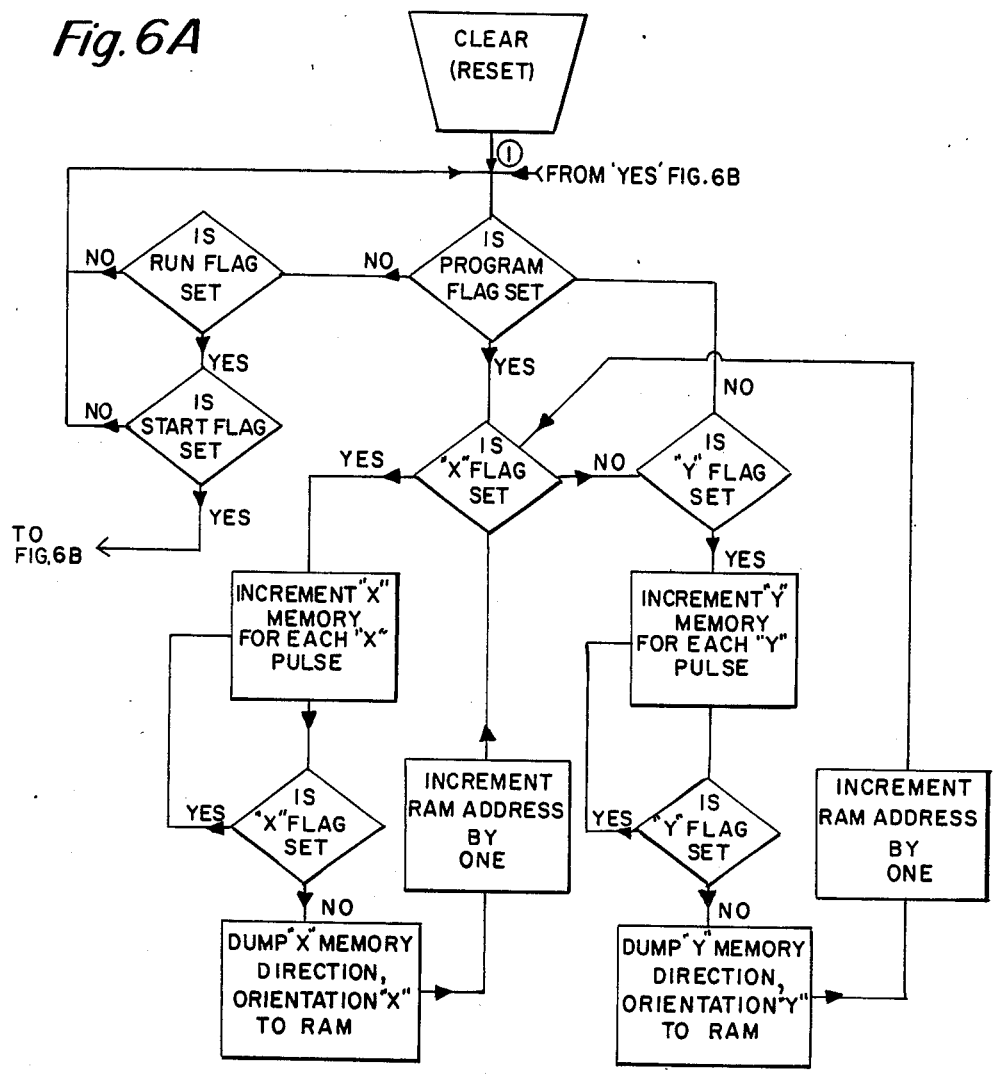
FIGS. 6A and 6B is a flow chart showing the algorithm of operation in association with the electronics of FIG. 5.
Figure 6B:
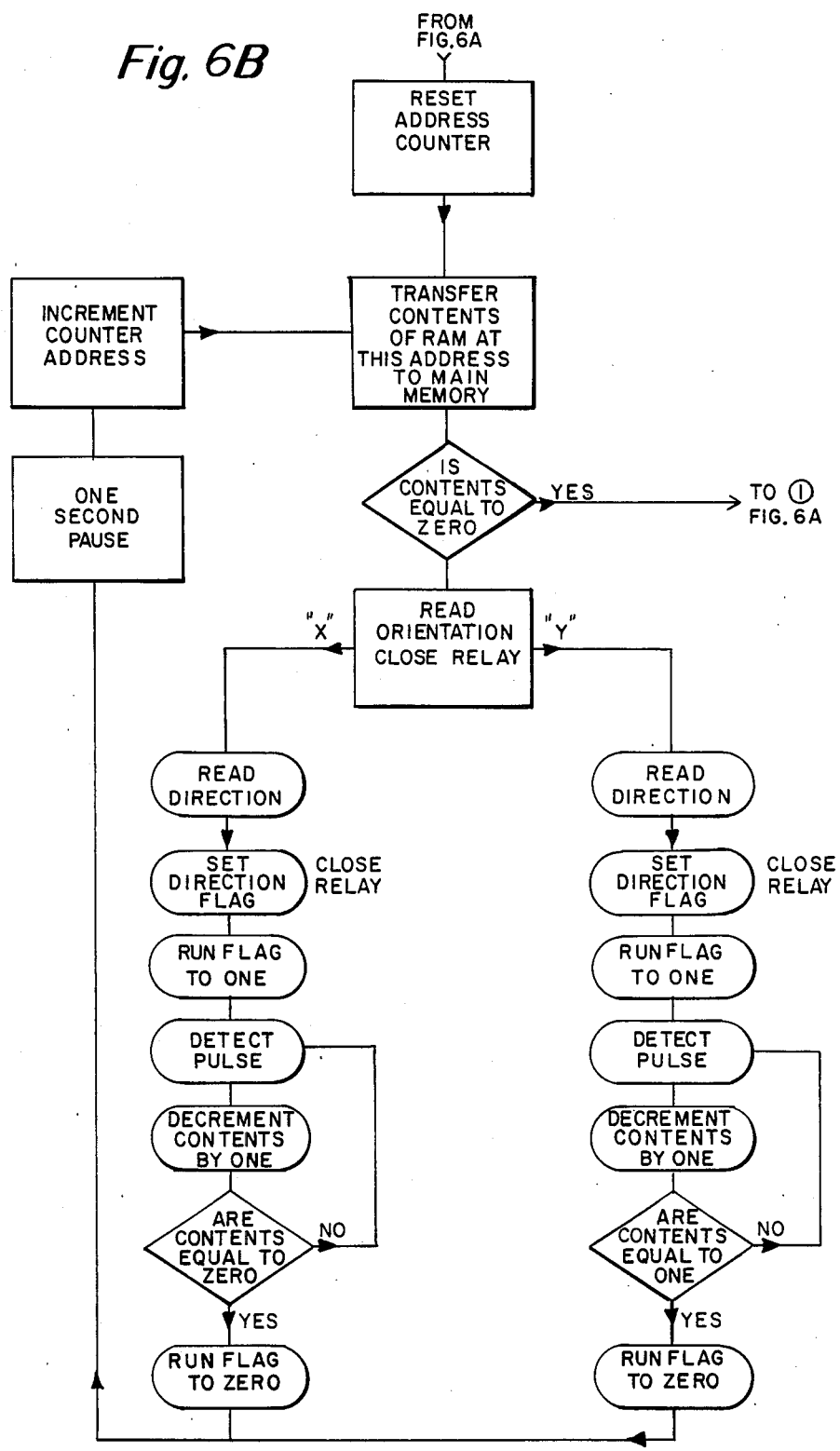

In addition to the controls shown on the control panel, the system also includes electronics such as shown in FIG. 5 and operated in accordance with the flow diagram of FIGS. 6A and 6B. The control electronics includes a microprocessor to be described hereinafter. The microprocessor is controlled basically in two modes of operation, the first being a program mode in which the program button 64 is used. The second mode is the run mode in which the run button 66 is operated. In the program mode, the machinist himself essentially writes a computer program and that program is stored in the computer memory. This program is a series of machining steps in the X and Y direction, each having a specified duration associated therewith. During the run mode, the computer controls the machine to essentially progress through the program from start to finish to reproduce a part previously made by the machinist at the original set-up of the machine. In this regard the machinist is preferably careful in making an exact part using the exact steps that he would be expected to follow in making the part. The microcomputer remembers all of the turns and sequences, stores them and then repeats the exact procedure for each part for an entire production run. With such an arrangement, backlash is no longer important, because every machinist has the intelligence to compensate for it, a knowledge that even a computer programmer lacks. When the machinist wants to change direction, he notes the exact position on the calibrator dial 72 at the end of a cut. He indexes the dial to zero without moving the crank or table. He then backs off carefully until he feels the resistance of the backlash being taken up. Then he resets the dial to zero. This is a normal procedure that he goes through in constructing a part. The system of the present invention reads all of these turns of the lead screw and because the work is clamped in exactly the same place each time, the backlash will always be exactly the same at a given point in the machining operation. When the operator then switches to the "run" mode, the system exactly reproduces what the machinist did previously. Therefore, the present system can be used with any milling machine whether new or old and without any concern over wear of the lead screw. Furthermore, it will produce work of + or −0.001 accuracy which is more than adequate for most production runs.

Where the machine is actually programmed by the machinist himself, the part that he actually produces is useable and thus there are no parts lost and no significant machine time lost in setting up a program. Also, no sophisticated highly skilled programmer or set-up person is needed. No elaborate hardware or electronics is required such as keyboards, paper tape punches, or digital display. No punched or magnetic tape is required since the program is stored on a microprocessor right in the device on the milling machine.

Figure 2:
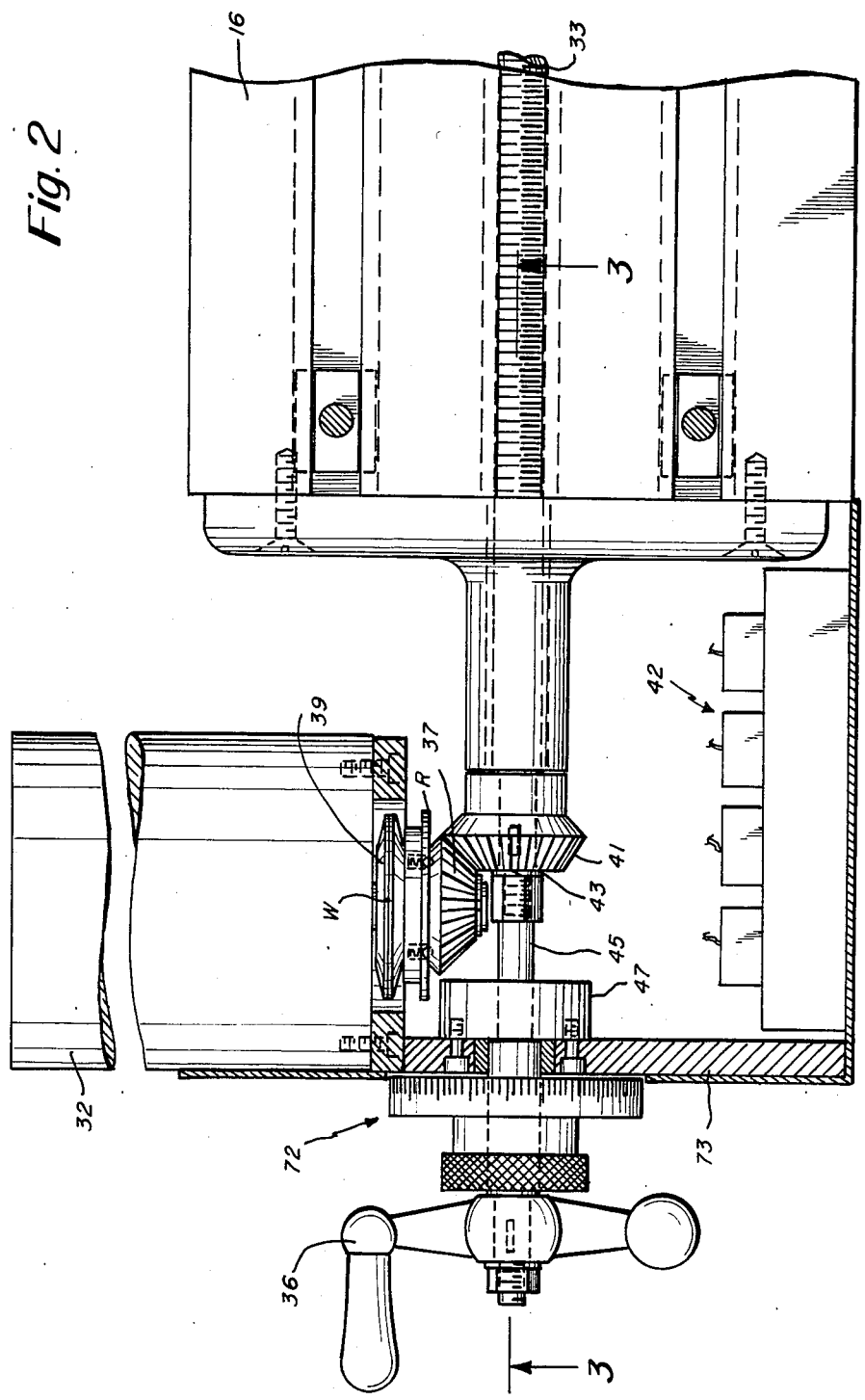
FIG. 2 is a cross-sectional view taken along line 2—2 of FIG. 1 and showing the mechanical coupling between the gear motor and lead screw.
Figure 3:
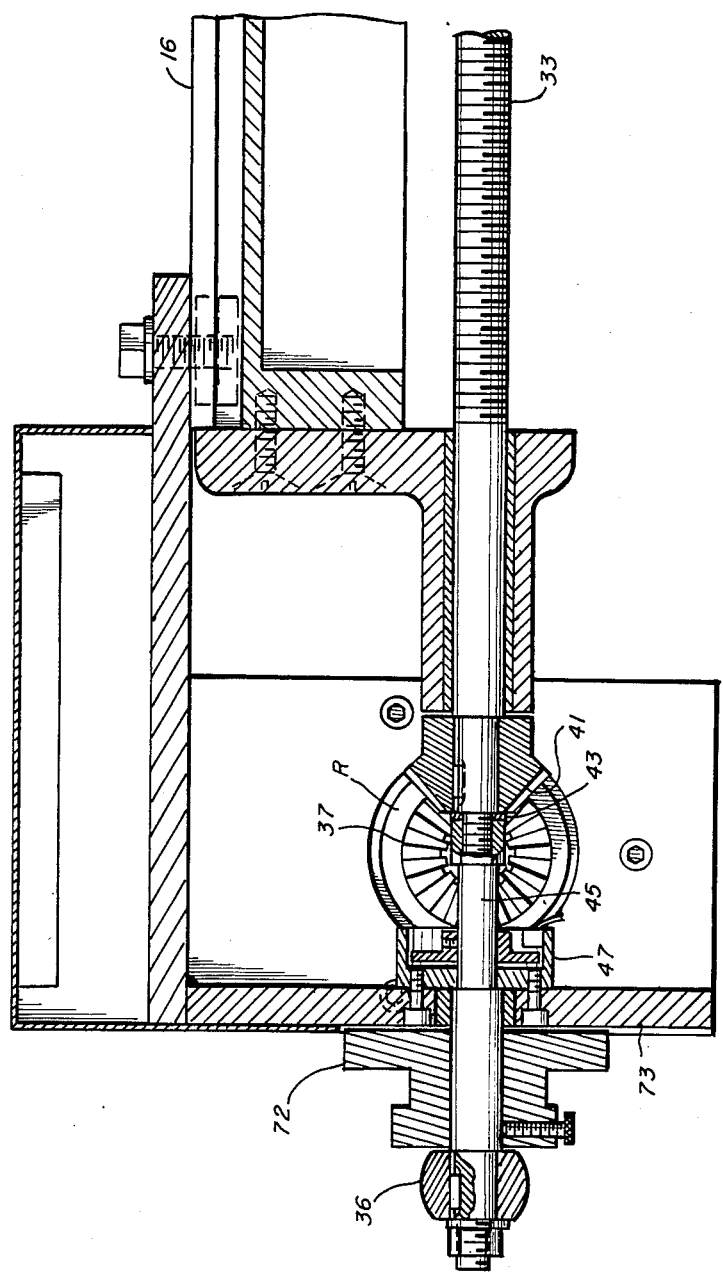
FIG. 3 is a further orthogonal cross-sectional view also showing the mechanical coupling.

FIGS. 2 and 3 show the detail of the connection of the gear motor 32 to the lead screw 33 which is associated with the X axis table 16. A substantially identical arrangement may be used in connection with the connection of the gear motor 34 to the lead screw 35 associated with the Y axis table 18. Because both of these arrangements are similar, only the interconnection at the X axis table is described herein. The gear motor 32 is coupled to a ball bearing retainer R which is mounted on the shaft and carries balls which normally register with sockets in the beveled gear 37. The ball bearing retainer R is part of an overload release mechanism 39 which also comprises a pair of Bellville spring washers W which provide a bias on the retainer R. The beveled gear 37 is loose fitting upon the gear motor shaft, but rotates with the shaft except under an overload condition. The beveled gear 37 interengages with the second beveled gear 41. The housing of the gear motor 32 is suitably secured to the housing of the control member 12.

As indicated previously, the hand crank is removed from its normal position on the lead screw and in its place is provided a second bevel gear 41 preferably secured with a lock washer 43 to the end of the lead screw 33. There is also provided a lead screw extension 45 about which the optical encoder 47 may be supported. The optical encoder 47 is discussed in detail hereinafter but basically counts the revolution of the lead screw providing a predetermined number of pulses for each complete revolution thereof. The encoder is preferably of 2 inch diameter and 0.80 inch thick having a moving part attached to the lead screw extension 45 with set screws. The body of the encoder is attached to the housing.

Thus, there is provided a relatively simple mechanical arrangement which permits use of the hand crank and which furthermore permits sensing of rotation of the lead screw whether it be by manual rotation or by rotation by way of the gear motor 32. This is accomplished quite compactly as indicated in FIGS. 2 and 3.

The particular motor selected as a drive is a gear motor as opposed to a stepping motor. The advantage of using the gear motor—encoder arrangement over the stepping motor is compactness of design, lower price, and elimination of a bulky power source. The gear motor—encoder design offers a better arrangement in determining table movement, in that, table movement is only recorded when the lead screw and attached encoder turn. This is not necessarily the case with stepping motors, for if an electrical pulse is sent to the stepping motor and the motor does not turn, the table location is incorrect. The encoder is outputting electrical pulses to the microprocessor, one pulse per 0.001 inch travel of the table. When the operator programs the system by machining the first part, he can use the handcrank or the gear motor as a power feed. On some jobs where dimensions are not critical, such as facing off a casting, the initial part can be made using the gear motor as a power feed. Also, the gear motor need not turn over when the first part is machined using the hand crank. The gear motor can be mechanically disengaged by compressing the spring washers. A separate mechanical member not described herein may be used for compressing the spring washers.

In the program mode, the pulses are read by the microprocessor as the encoder connected to the lead screw is turned. At the end of each machining step the microprocessor stores the total number of pulses in the memory. When the production operation is performed automatically (run mode), the gear motor only is driving the lead screw. As the lead screw turns, the encoder once again sends pulses to the microprocessor and each pulse is subtracted from the total number of pulses in the memory. When the total reaches zero pulses, that particular machining step is complete.

The microprocessor and associated electronics can be mounted at any convenient location on the milling machine, preferably within the control member 12 such as directly behind the control panel shown in FIG. 1.

Another feature of the present invention has to do with the manual control via the manual control section 40 of the control panel. In this case, where the programming feature is not used, the stepping motors serve as variable speed power feeds for the tables. Power feeds are useful for doing many jobs, as they relieve the operator of monotonous and often tiring hand cranking. The pause function as controlled by the "pause" button 68 is used where some sort of manual intervention is desired. For example, if the depth of cut is to be changed at some point in the program, this is not possible with a device controlling only in the X and Y axis. Thus, when machining the sample part, the operator simply presses the "pause" button before doing any operation that the machine is not capable of performing. Thereafter, when the machine is operated in the run mode, when it comes to this manual operation, the hold button or "pause" button 68 is illuminated. This indicates to the operator that a manual operation is to be conducted. After this operation is completed, then the operator can resume operation by pushing the "resume" button 70.

The basic components of the system, in addition to the gear motors and optical encoders, includes electrical relays and the microprocessor shown in FIG. 5. The electrical relays are used to start and stop the power motors 32 and 34 upon commands from the microprocessor.

The electronic control is shown in FIGS. 5 and 6. FIG. 6 shows the flow chart of control associated with the programming of the microprocessor. The circuitry in FIG. 5 includes a microprocessor 90, erasable programmable read only memory (EPROM) 91, random access memories 92, 93, and an input-output port 96. Each of these devices is of conventional design and of the type as identified in FIG. 5, although other brand names can be used as long as the device function is the same. The primary control pulses from the respective X and Y encoders couple to X pulse (CW and CCW), and Y pulse (CW and CCW) inputs on the lines 106, 107, 103, 104, respectively, into the microprocessor 90. The pulses on any of these lines at any one time are counted to determine length of table movement in any one machining step.

In FIG. 5 the memory 91 may be an erasable programmable read only memory with the memories 92 and 93 being random access memories. FIG. 5 shows the data lines 94 which couple between the microprocessor and the EPROM. These data lines also couple to the input/output port 96 and the random access memories 92, 93. The input/output port receives input signals from the manual control buttons such as from the "program" button 64, the "run" button 66, the "pause" button 68, and the "resume" button 70. Outputs are also taken from the input/output port 96 at lines 106 coupling to a series of indicators (e.g. light emitting diodes) 108. These indicators correspond substantially to the switches just previously discussed. Each of the functions of the indicators are indicated directly on FIG. 5. The data input to the input/output port from the microprocessor also controls three outputs indicated in FIG. 5 as the reverse output (i.e. the normal motor direction is CW, therefore reverse would be CCW), the Y-on output and the X-on output. These couple to respective relays R1, R2, and R3. As indicated previously the electrical relays are used to start and stop the power motors upon commands from the microprocessor. These three such commands are used with the reverse command being used in common between both X and Y controls.

With regard to operation in the program mode, as indicated previously optical encoders are secured to the lead screw for both X-direction and Y-direction detection. Each encoder outputs 200 pulses per revolution of the lead screw corresponding to 0.2 inches of travel of the machine table. As the machine is performing the machining step, the encoder is outputting electrical pulses to the microprocessor, one pulse per 0.001 inch of travel of the table. These are the pulses that are inputted on either line 106, 107 for X control, and line 103, 104 for Y control depending upon the particular encoder that is then sensing operation. At the end of the machining step the machinist signals the microprocessor that the step is complete by waiting at least one second prior to performing the next step. The program interprets this as a termination of one step in the machining process. The microprocessor then stores three parameters (No. 1) the total number of pulses, (No. 2) the direction of rotation which is taken from the encoder, and (No. 3) and whether it is an X axis or Y axis sensing. This process is repeated until all X and Y machining steps have been completed. The machinist has the option of programming a pause after any machining step. The purpose of the pause would be to change cutting tools or manually change the position of the Z axis. In the program mode as just discussed, the program button is pushed to indicate that a program is being written. This causes a corresponding illumination of the program indicator which is one of the indicators 108 shown in FIG. 5. Pulses are inputted to the microprocessor on lines 106, 107, 103, 104 in a mutually exclusive manner and in a continuous manner. The pulses are identified as either X or Y and the pulses are also identified as being either positive or negative. When the pulse input is complete a one second wait signals the microprocessor that the machining step is over. Thereafter a new series of countings occur with a new data word being transferred to memory representing a subsequent machining step. Each step is identified by the number of pulses, the rotational direction and the table direction.

It is important that the machinist position the table in the same place as it was at the start of creating the program.

After the program mode has been completed then the operator is ready to enter the run mode. The run button is then depressed. Information that has been stored for the first machining step is identified as to direction of table, direction of rotation, and distance of travel in the form of total number of pulses. The information for controlling the relays R1, R2 and R3 is transferred from the random access memories to the microprocessor. The microprocessor then outputs signals corresponding to the direction of rotation and direction of table (i.e. X or Y) to the input/output port which in-turn signals the proper relays to close. The X or Y identifier outputs a pulse to close either the X or Y relays. The direction identifier will output a pulse to close the rotational direction relay if the direction is CCW, the normal or open relay position being CW. This relay is identified as R1 in FIG. 5. After the relays have closed the gear motor 32 (FIG. 2) will drive the lead screw 33 (FIG. 2) and turn the encoder 47 (FIG. 2). The encoder then sends pulses back to the microprocessor 90 (FIG. 5) which are subtracted from the total number of pulses for this step. When the number of incoming pulses equals the total number of pulses for this machining step the step is complete and the microprocessors signals relays R1-R3 to open. Thereafter the program then progresses to the next set of data after a one second pause.

FIG. 6 is a flow chart showing the algorithm that is used in association with the microprocessor 90 and which is stored in the EPROM 91.

Having described one embodiment of the present invention, it should now be apparent to those skilled in the art that numerous other embodiments are contemplated as falling within the scope of this invention as defined by the appended claims.

What is claimed is:

1. A system for use with and for controlling the operation of a milling machine in at least two different axes of movement, each having a lead screw, comprising:
a first electrical drive motor associated with a first axis of movement and first lead screw,
a second electrical drive motor associated with a second axis of movement and second lead screw, a first encoder coupled to and for sensing rotation of said first lead screw, a second encoder coupled to and for sensing rotation of said second lead screw, said first and second encoder providing respective electrical pulse signals with the number of pulses corresponding to length of movement by operation of the respective lead screws under manual control and further providing a signal representative of direction of lead screw rotation, processor means responsive to said encoders for storing data corresponding to the electrical pulse signals for each machining step manually accomplished, and control means operating in a program mode to enable data storage and in a run mode to provide control to the first and second electrical drive motors in accordance with the machining steps previously stored in the processor means to thereby automatically reproduce a part substantially identical to one produced manually, said control means including first switch means for establishing a program mode and second switch means for establishing a run mode, said processor means including means in the program mode for storing data corresponding to the number of electrical pulse signals for each machining step and the direction of rotation, means in the run mode for operating said drive motor to drive its associated lead screw causing the corresponding encoder to transmit pulses back to the processor means, and means for counting the number of pulses received to thereby terminate that step when the received pulses equal the previously stored pulses, said control means further including a third switch means for establishing, during the program mode, a pause in operation to enable a manual step during the run mode, said control means further including a fourth switch means for establishing a resuming of operation during the run mode and after the initiation of a pause, means responsive to said third switch means operated during the program mode to cause a pause signal to be stored in the processor means, means responsive to said pause signal during the run mode to cease automatic operation at the conclusion of a particular step so as to enable a manual step during the run mode, said means responsive to said pause signal including means for providing a sensory signal to indicate to the operator that a pause has occurred to thereby enable the operator to carry out the manual step, and means responsive to said fourth switch means operated during the run mode to cause resumption of automatic operation.

2. A system as set forth in claim 1 wherein the processor means comprises means for storing (1) number of pulses, (2) direction of rotation, and (3) whether X or Y movement.

3. A system as set forth in claim 2, including indicators associated with the program, run, pause and resume modes.

4. A system as set forth in claim 1 including means for coupling the electrical drive motor to the lead screw including gear menas mounting the drive motor orthogonally to the lead screw.

5. A system as set forth in claim 4 wherein said gear means includes a pair of bevel gears.

6. A system fro use with and for controlling the operation of a milling machine in at least two different axes of movement, each having a lead screw, comprising:

a first electrical drive motor associated with a first axis of movement, and first lead screw, a second electrical drive motor associated with a second axis of movement, and second lead screw, a first encoder coupled to and for sensing rotation of said first lead screw, a second encoder coupled to and for sensing rotation of said second lead screw, said first and second encoders providing respective electrical pulse signals with the number of pulses corresponding to length of movement by operation of the respective lead screw under manual control, processor means responsive to said encoders for storing data corresponding to the electrical pulse signals for each machining step manually accomplished, and control means operating in a program mode to enable data storage and in a run mode to provide control to the first and second electrical drive motors in accordance with the machining steps previously stored in the processor means to thereby automatically reproduce a part substantially identical to one produced manually, means for coupling the electrical drive motor to the lead screw including gear means mounting the drive motor orthogonally to the lead screw, and means for mounting a hand crank to and in line with the lead screw, including a stand and a table movably mounted on the stand, the lead screw rotatably secured to the table whereby upon rotation of the lead screw, the table is caused to move in the direction of the lead screw axis, said gear means comprises a bevel gear means, wherein said bevel gear means comprise a first bevel gear secured to the lead screw and a second bevel gear disposed 90° thereto and driven from the drive motor, wherein the hand crank is secured to a lead screw extension which also supports the encoder, a hand crank attaching to one end of the lead screw extension and the other end of the lead screw extension being secured to the lead screw at the first bevel gear, said control means including a first switch means for controlling the program mode and a second switch means for controlling the run mode, said control means further including a third switch means for establishing, during the program mode, a pause in operation to enable a manual step during the run mode, said control means further including a fourth switch means for establishing a resuming of operation during the run mode and after the initiation of a pause, means responsive to said third switch means operated during the program mode to cause a pause signal to be stored in the processor means, means responsive to said pause signal during the run mode to cease automatic operation at the conclusion of a particular step so as to enable a manual step during the run mode, said means responsive to said pause signal including means for providing a sensory signal to indicate to the operator that a pause has occurred to thereby enable the operator to carry out the manual step, and means responsive to said fourth switch means operated during the run mode to cause resumption of automatic operation.

7. A method for controlling the operation of a milling machine in at least two axes of movement, comprising the steps of;

establishing multiple mode operation including program, run, pause and resume modes of action, operating the machine in both X and Y axes through a predetermined set of steps during the program mode to produce a pattern part, reading the steps in the same sequence as manually carried out, storing data corresponding to the exact steps operated through manually by the machine operator, storing, amidst the data, a pause signal during the program mode to enable a manual operation during subsequent automatic operation, running the machine thereafter in the run mode under control of the stored data to drive the machine in like X and Y axes to reproduce a part alike the pattern part, reading, during the run mode, the pause signal to interrupt automatic operation at the conclusion of a particular step so as to enable a manual step during the run mode, providing a sensory signal to indicate to the operator that a pause has occurred to thereby enable the operator to carry out the manual step, performing the manual step under operator control, and, after conclusion of said manual step, resuming automatic operation and thus continuing the run mode of operation.

8. A method for controlling the operation of a milling machine in at least two axes of movement, comprising the steps of;

establishing multiple mode operation including program, run, pause and resume modes of action, operating the machine in both X and Y axes through a predetermined set of steps during the program mode to produce a pattern part, reading the steps in same sequence as manually carried out, storing data corresponding to the exact steps operated through manually by the machine operator, establishing a pause action during the program mode to enable a manual operation during subsequent automatic operation, running the machine thereafter in the run mode under control of the stored date to drive the machine in like X and Y axes to reproduce a part alike the pattern part, sensing stored data indicative of a pause in operation thereby enabling a manual operation, after concluding said manual operation resuming automatic operation and thus continuing with the run mode of operation, providing a first switch means for program operation, a second switch means for run operation, a third switch means for controlling the pause in operation, and a fourth switch means for controlling the resuming of operation, wherein the system operator selects the third switch means to cause an interruption signal to be stored whereby during the run mode, automatic operation is interrupted when a manual step is to be carried out, providing a sensory signal to indicate to the operator that a pause has occurred to thereby enable the operator to carry out the manual operation, performing the manual operation under operator control, and selecting the fourth switch means to resume automatic operation.

* * * * *